United States Patent
Mabuchi et al.

(10) Patent No.: US 7,020,616 B1
(45) Date of Patent: Mar. 28, 2006

(54) EVALUATION SYSTEM FOR EQUIPMENT VENDORS

(75) Inventors: Kazuyuki Mabuchi, Yokohama (JP); Natsuki Takahashi, Tokyo (JP); Yukiko Sato, Hachioji (JP)

(73) Assignee: Otis Elevator Company, Farmington, CT (US)

( * ) Notice: Subject to any disclaimer, the term of this patent is extended or adjusted under 35 U.S.C. 154(b) by 267 days.

(21) Appl. No.: 10/110,944

(22) PCT Filed: Oct. 18, 2000

(86) PCT No.: PCT/IB00/02013

§ 371 (c)(1),
(2), (4) Date: Apr. 15, 2002

(87) PCT Pub. No.: WO01/28307

PCT Pub. Date: Apr. 26, 2001

(30) Foreign Application Priority Data

Sep. 24, 1999 (JP) .......................................... 11/269700

(51) Int. Cl.
*G06F 17/60* (2006.01)

(52) U.S. Cl. ............................... 705/7; 705/11; 705/400
(58) Field of Classification Search .................... 705/1, 705/7, 8, 11, 400
See application file for complete search history.

(56) References Cited

U.S. PATENT DOCUMENTS

| 5,576,965 | A | * | 11/1996 | Akasaka et al. | ............. 700/122 |
| 6,110,213 | A | * | 8/2000 | Vinciarelli et al. | ............. 703/1 |
| 6,295,513 | B1 | * | 9/2001 | Thackston | ..................... 703/1 |
| 6,301,574 | B1 | * | 10/2001 | Thomas et al. | ................. 707/1 |
| 6,446,053 | B1 | * | 9/2002 | Elliott | .......................... 705/52 |

FOREIGN PATENT DOCUMENTS

JP 408263537 * 10/1996

OTHER PUBLICATIONS

Rosenfeld "specifications: the packaged elevator"; Oct. 1989; Progressive Architecture, v70, n10, p53(3); Dialog file 148.*

* cited by examiner

*Primary Examiner*—Romain Jeanty

(57) ABSTRACT

The evaluation system (1) registers equipment and service vendors, such as design offices, etc. as members (7,8,9), and registers design requests and construction requests for elevators according to project performance parameters for each member. The system (1) accumulates points in a data base (2) for each member. The points are periodically evaluated (5) and an evaluation result is generated and sent (6) to its member. Members use its evaluation result to improve performance and select future vendors.

2 Claims, 2 Drawing Sheets

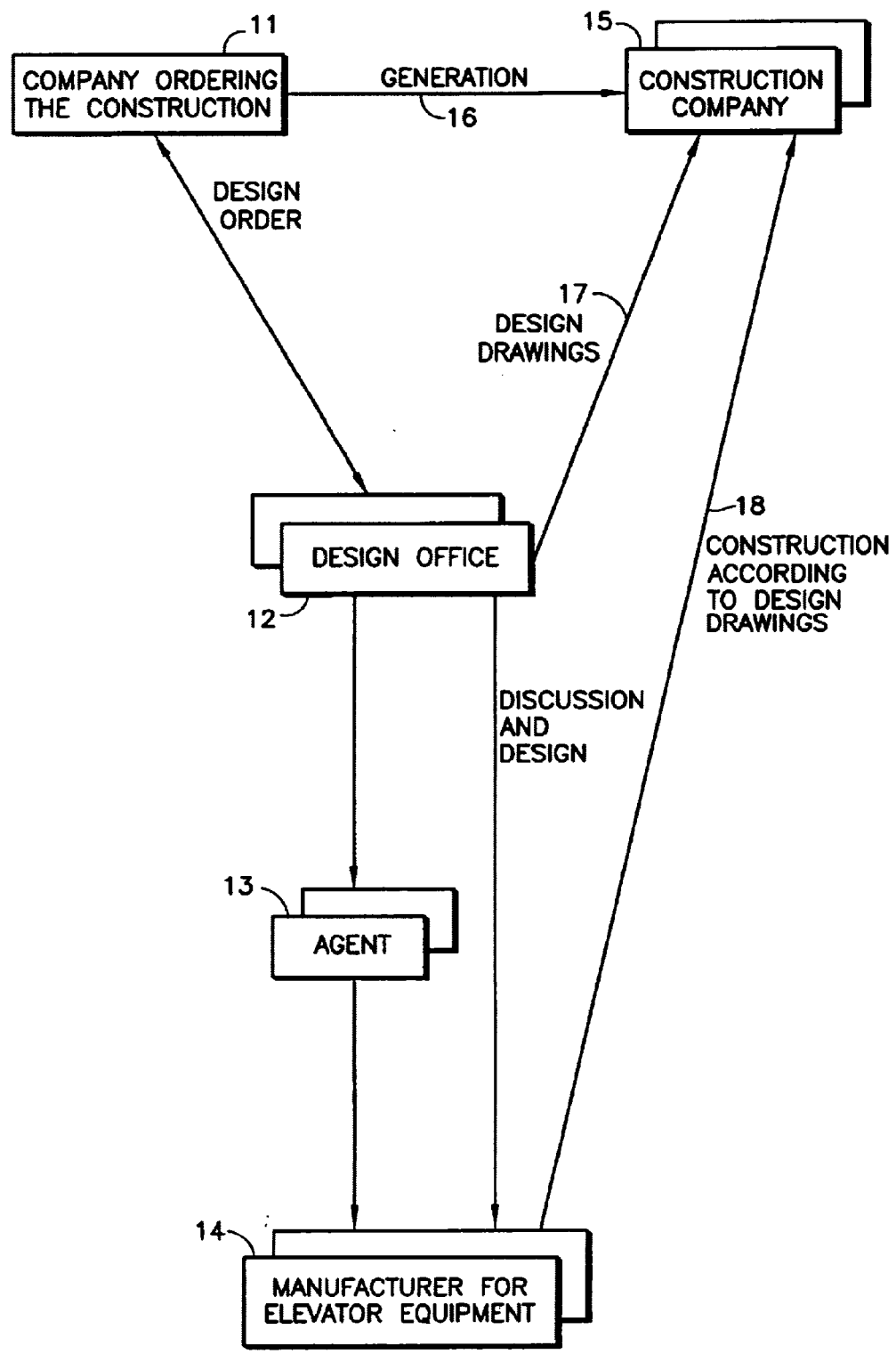

EVALUATION SYSTEM FOR EQUIPMENT VENDORS

FIELD OF THE INVENTION

1. Technical Field of the Invention

This invention pertains to an evaluation system for equipment vendors, such as vendors of elevators and escalators.

2. Background

Elevators and escalators are installed in buildings, apartments, hospitals, plants, airports, railway stations, etc. For design of such elevator equipment, the developer of the building sends a design order for the building to a construction design office. The construction design office then sends the design order for the elevator to an elevator equipment manufacturer. The manufacturer then prepares detailed cost estimations and design drawings. After the manufacturer receives the order and signs the contract, the construction company or the general contractor uses the design drawings to integrate the elevator or escalator into the design of the building. At the appropriate time, manufacture, delivery and installation of the equipment is completed.

As shown in FIG. 2, for the relationship among the design office 12, construction company 15 and manufacturer for elevator equipment 14, the developer 11 sends the order to one or several design offices 12 selected from a plurality of design offices. Each design office then sub-contracts with one or several manufacturers 14 selected from plurality of manufacturers to perform design work, either directly or through an agent 13. The general contractor 15 then performs the construction based on the order 16 from the developer and the design drawings 17,18 received from the design office 12 and manufacturer 14. Also, fabrication of the elevator equipment is performed by the manufacturer, and the manufacturer in charge of design may be different from the manufacturer in charge of construction.

The steps in the detailed procedure of the business of the manufacturer for elevator equipment include discussion (schematic discussion on contract, technical aid, etc.), estimation (preparation of estimation book, etc.), order receiving (determination of the final specifications, shipment time, etc.), contract order (publication of management book, order book, etc.), manufacturing and installation (approval of drawings, procedure, manufacturing, etc.), shipment (checking, transfer, etc.), recovery and payment (publication of request, warranty, etc.).

As explained in the above, for the business of manufacturers for elevator equipment, it is necessary to perform these steps smoothly. Such steps include design order, design, and construction for elevator equipment. In particular, in each step of operation, the business activity has to be carried out based on the design and construction results that have been agreed, and cooperation between the design office and agent is needed.

On the side of the design office and agent, in order to coordinate the fabrication and installation of the elevator equipment appropriately, among the many manufacturers, it is necessary to evaluate and select manufacturers that can perform reliably and can provide highly reliable design/service business support.

The purpose of this invention is to provide an evaluation system for elevator equipment vendors which can support cooperation between many design offices and agents and can provide the design office with information for evaluating and selecting an appropriate manufacturer.

DISCLOSURE OF THE INVENTION

This invention provides an evaluation system for vendors of elevator equipment and services, which accumulates points for each member based on such member's performance in evaluating appropriately a design order for elevator equipment and/or the construction order of the designed project (elevator equipment).

According to its preferred embodiment of the invention, an evaluation system for elevator equipment vendors is provided. The system includes a bank registering processing means which receives information from the aforementioned design offices or agents as members and, when there is a design order for elevator equipment by any member, accumulates the points for that member in a data base for a registration corresponding to the scale of the design order for the elevator equipment by the member;

an order receiving registering means, which, when there is an order placed by a member for construction of a project that has been designed, accumulates points for that member in the data base corresponding to the scale of the construction order of the project by the member;

a result determination processing means, which regularly reviews the points added/registered to the aforementioned data base for each member and determines an evaluation result for each member;

and a result information generating means, which sends the aforementioned evaluation results to said members and which transfers the results to managers of elevator equipment manufacturers.

BRIEF DESCRIPTION OF THE DRAWINGS

FIG. 2 is a diagram illustrating a typical design/construction relationship for elevator equipment.

BEST MODE FOR CARRYING OUT THE INVENTION

Figure 1:
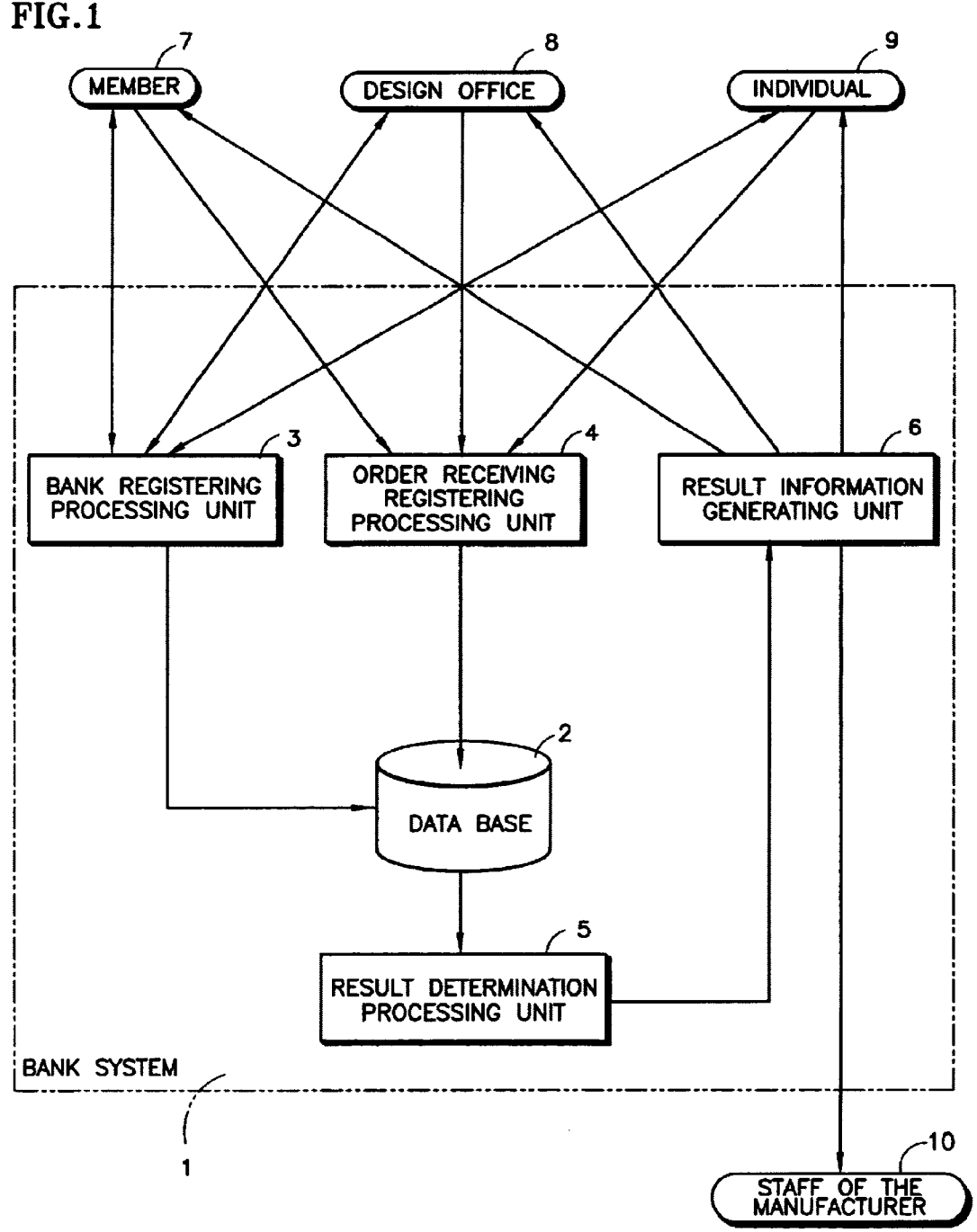
FIG. 1 is a structural diagram illustrating the evaluation system according to the present invention.

FIG. 1 is a diagram illustrating the evaluation system for equipment vendors in an embodiment of this invention. The portion defined by the broken line is the function block.

The system 1 for elevator equipment vendor evaluation has a data base 2 and software functional blocks 3–6. The data base and functional blocks may be programmed in a stand-alone computer or included as one of many functions provided by an Internet website, portal or remote application provider. Data base 2 is a relational data base or an object-oriented data base.

For bank registering processing unit 3, design offices 7,8,9 (including agents) are registered as the system's members. Also, the managers in charge of the design orders in the offices may be registered as individual members of the system. For these members, the information regarding the placing of a design order of the elevator equipment is collected from the specifications, etc. by the bank registering processing unit 3 and is registered in data base 2.

The design order information may include the date of sending of the order, the address and name of the member, as well as points corresponding to the complexity and size of the order. The design order points can be awarded, for example, as follows for each design unit, each meter of the lift distance or running distance is taken as a point. Also, for unit points, it is preferred that the difference in the floor area of the elevator or escalator be taken into consideration, and the difference between a high-speed elevator and low-speed elevator be also taken into consideration, that is, the difference in the type and performance of the elevator equipment are included as factors related to points.

In the data base 2, the design order information that has been processed for registration in the system is stored as points for each member, and the sum of the points is also accumulated.

In the order receiving registration processing unit 4, after placement of a firm order for actual construction of the elevator equipment, an evaluation coefficient, such as two times the design order point number, is generated corresponding to the aforementioned lift distance or the like, and an evaluation coefficient operation command is executed based on the decision order points of the corresponding members 7,8,9. The actual order points thus generated are accumulated in the data base 2 for each member.

In result determination processing unit 5, on a regular basis, the points that have been added up and registered in data base 2 are retrieved for each member, and determination is made on whether a predetermined threshold level has been exceeded. If it is determined that the point level for a member 7,8,9 has been exceeded for a certain step by said result determination processing unit 5, result information generating unit 6 generates the evaluation result information of the member. This result information is sent to the member, and may also be published as, the privilege points of the member. Also, the result information is sent as evaluation result information of the member to the staff of the manufacturer 10 in charge of the business.

Also, the calculation of points is not limited to fixed parameters corresponding to the lift distance or the like, and they may also include bonus points based on scheduling success or objective customer evaluations. When the degree or period of evaluation are changed appropriately, the processing function in processing units (3) and (4) may be modified to reflect the change.

Consequently, for the evaluation system according to the present invention, when there is a design order for elevator equipment or an order for a design project by a member, the system accumulates a point total for each member, and a notice transmitted when the accumulated points overrun a threshold value, is generated. This information is sent to the member, and to the manager of the manufacturer, in charge of the order.

In this way, the manager of the manufacturer in charge of the order obtains information that can allow appropriate evaluation of designs and construction results that have been carried out, and the information can be used in the business in cooperation with the design office or agent. Also, based on the results achieved, the staff of the design office or agent can get information for evaluating and selecting a manufacturer which can perform business appropriately and can support the design and service business with high reliability.

As explained in the above, according to this invention, for each member, it is possible to add up and register result points pertaining to a design order of elevator equipment and a construction order of a project that has been designed. Consequently, it can provide information that can support the business with cooperation between many design offices and agents, and can enable evaluation and selection of an appropriate manufacturer for the design office.

What is claimed is:

1. An evaluation system for equipment vendors characterized in that:

the system includes means for processing design order information for equipment received from at least one design office or agent and construction order information for projects that have been designed; wherein the system further includes a bank registering processing means (3) for registering said design office or agent as a member (7,8,9) and, in response to a design order for elevator equipment by a member, for accumulating points for said member in a data base (2) corresponding to the scale of the design order for the elevator equipment by the member;

order receiving registration processing means, for, in response to a firm order by a member for construction of a project that has been designed, generating actual order points for the member and storing said points in the data base (2) corresponding to the scale of the construction order of the project by the member;

a result determination processing means (5), for regularly reviewing the points accumulated in the data base (2) for each member and generating an evaluation result for each member;

and a result information generating means (6), for sending the evaluation results to said members (7,8,9) and for sending the results to equipment manufacturers (10).

2. The system as recited in claim 1, further characterized in that the result determination processing means further comprises:

means for comparing the points accumulated in the data base for each vendor with a predetermined threshold level.

* * * * *